United States Patent
Uehara (10) Patent No.: US 6,581,826 B1
(45) Date of Patent: Jun. 24, 2003

(54) READER APPARATUS

(75) Inventor: Motoshi Uehara, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/576,420

(22) Filed: May 22, 2000

(30) Foreign Application Priority Data

May 25, 1999 (JP) .......................................... 11-145456

(51) Int. Cl.⁷ ............................................... G06K 5/00
(52) U.S. Cl. ..................................... 235/380; 235/454
(58) Field of Search .......................... 235/380, 462.01, 235/494, 454, 482; 250/569

(56) References Cited

U.S. PATENT DOCUMENTS

| | | |
|---|---|---|
| 5,034,619 A | 7/1991 | Hammond, Jr. |
| 5,053,612 A | 10/1991 | Pielemeier et al. |
| 5,357,094 A * | 10/1994 | Baldwin ..................... 235/456 |
| 5,664,231 A * | 9/1997 | Postman et al. ............ 395/893 |
| 6,298,016 B1 * | 10/2001 | Otsuka ........................ 369/14 |
| 6,321,984 B1 * | 11/2001 | McCall et al. .............. 235/380 |

FOREIGN PATENT DOCUMENTS

| | | | |
|---|---|---|---|
| DE | 39 10 633 A1 | 10/1990 | |
| EP | 1056037 A2 * | 11/2000 | ............ G06K/7/14 |
| JP | 58-123165 | 7/1983 | |
| JP | 60-64485 | 5/1985 | |
| JP | 4-132622 | 12/1992 | |
| JP | 6-266873 | 9/1994 | |

* cited by examiner

Primary Examiner—Thien M. Le
Assistant Examiner—Lisa M Caputo
(74) Attorney, Agent, or Firm—Dickstein Shapiro Morin & Oshinsky LLP (57) ABSTRACT

A reader apparatus includes a card slot unit receiving a card on which a pattern code is attached; a LED array having a light emitting plane for emitting light of a light path width smaller than the diameter of the light emitting plane; a reflective mirror having a portion facing the card received through the card slot unit, the facing portion having a length smaller than the diameter of the light emitting plane of the LED array for reflecting light emitted from the LED array to direct the light to the pattern code of the card received through the card slot unit; and a reader device receiving light reflected from the pattern code of the card. Since the card slot depth can be made smaller than the conventional one so that the card can be inserted into the reader apparatus without hiding the information attached at the predetermined position, the user can view the information. The insert position of the card can be optimized.

17 Claims, 11 Drawing Sheets

READER APPARATUS

BACKGROUND OF THE INVENTION

1. Field of the Invention

The present invention relates to reader apparatuses, particularly to a reader apparatus allowing optimization of the card insert state.

2. Description of the Background Art

Figure 1:
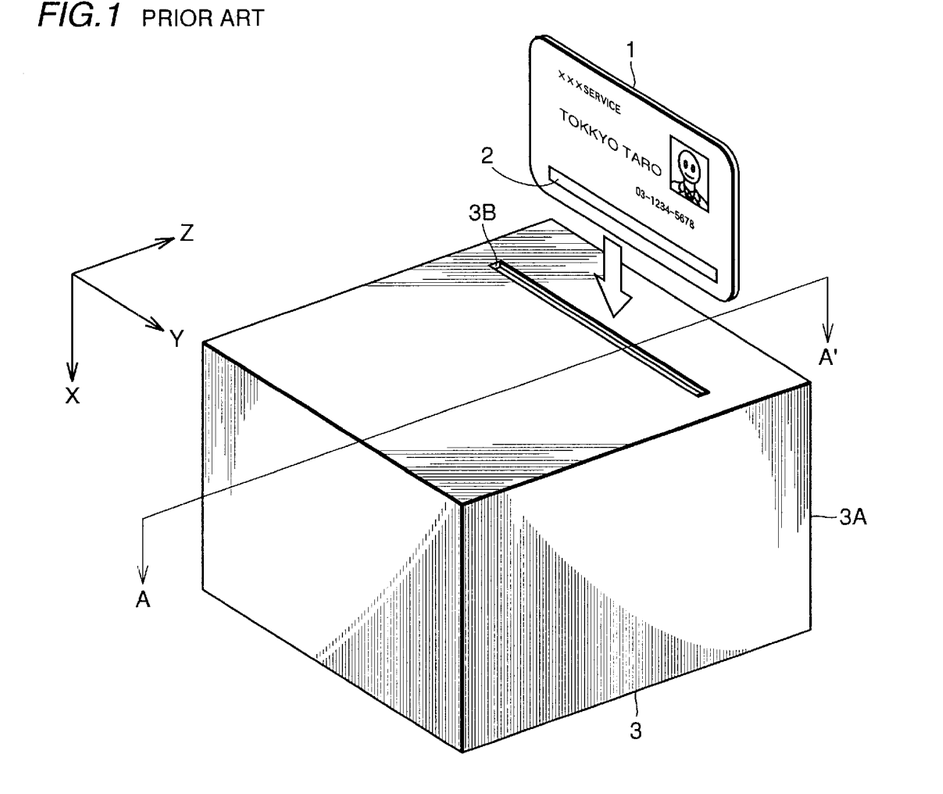
FIG. 1 shows a usage of a conventional reader apparatus.

FIG. 1 shows a usage of a reader apparatus 3 that reads out a two-dimensional bar code or two-dimensional dot code (generically referred to as "pattern code" hereinafter when distinction therebetween is not required) printed on a card 1.

Figure 2:
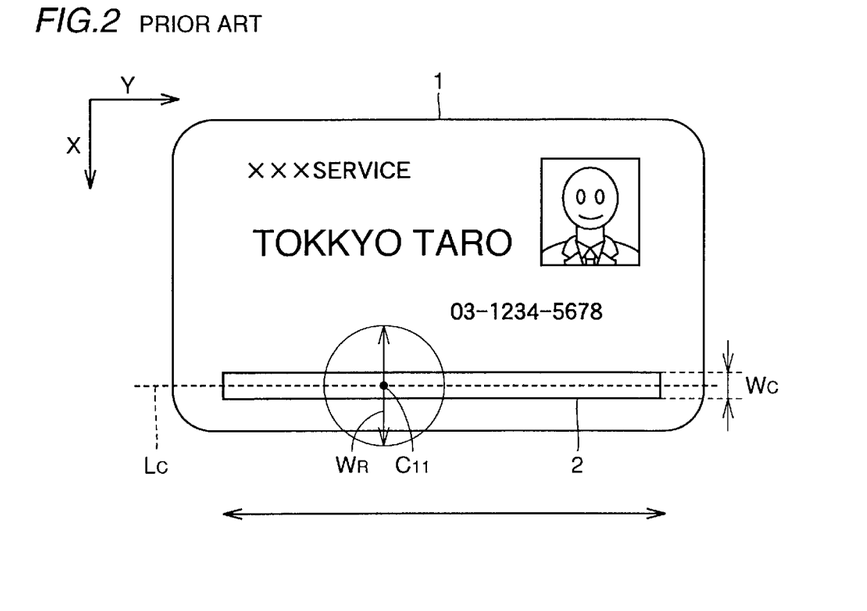
FIG. 2 shows a card 1 of FIG. 1.

Card 1 is a business card formed of paper or plastic, for example. One plane (referred to as "print plane" hereinafter) has the company name, individual name, telephone number, face picture, and a pattern code 2 printed, as shown in FIG. 2. Pattern code 2 is a color code having a width WC, corresponding to a pattern code of a plurality of color elements such as cyan, magenta and yellow.

Card 1 is to be inserted into a card slot unit 3B provided at the top face of a package case 3A in the state as shown in FIG. 1 (print plane of card 1 facing the front with pattern code 2 located at the bottom side). When card 1 is inserted in this manner, reader apparatus 3 reads out predetermined information from pattern code 2 of card 1 to execute a process based on the information read out.

Figure 3:
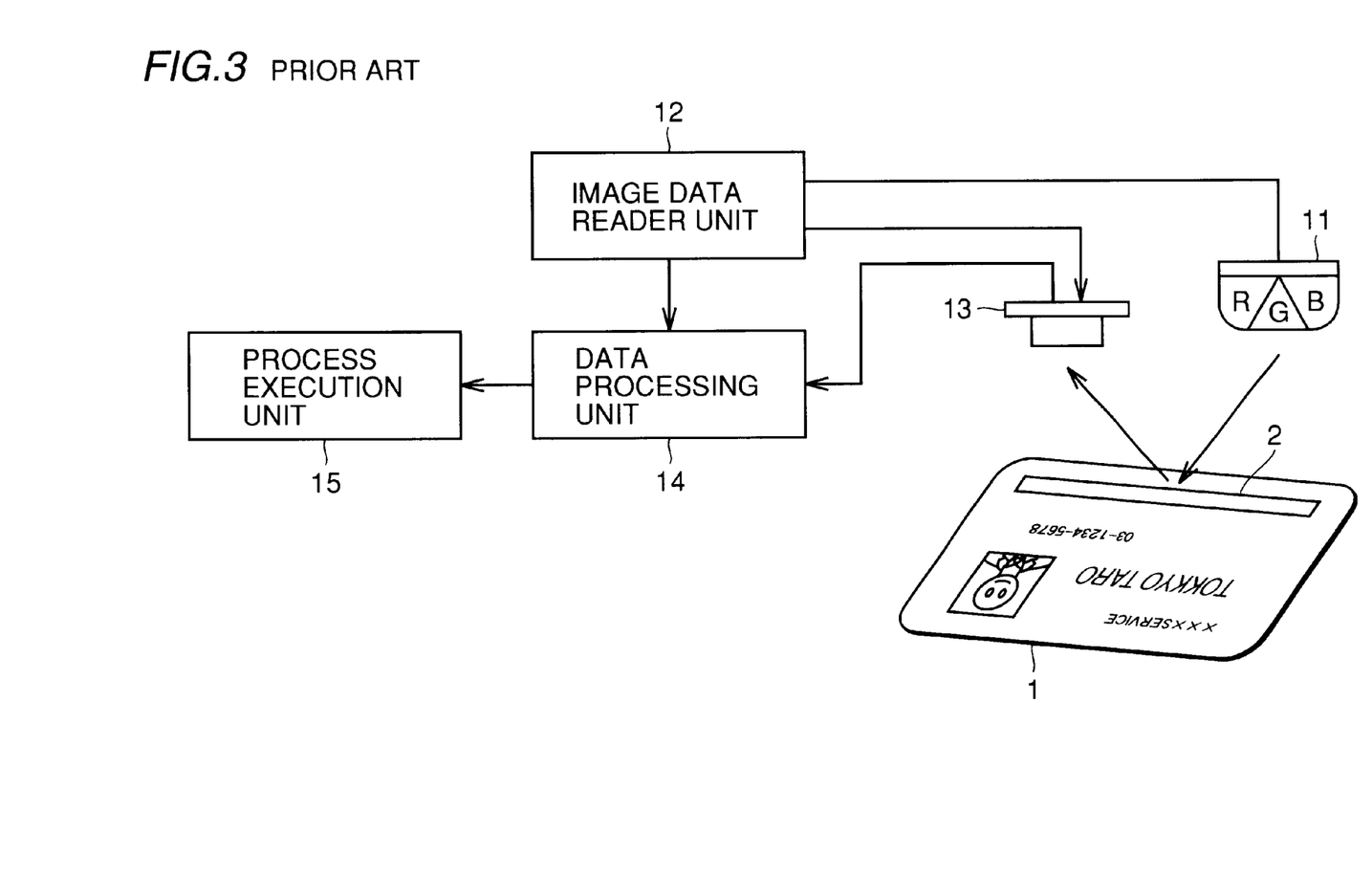
FIG. 3 is a block diagram showing an example of a structure of the reader apparatus of FIG. 1.

FIG. 3 shows an example of the internal structure of reader apparatus 3. An LED (Light Emitting Diode) array 11 is a light source projecting a color beam of red (R), green (G) or blue (B) to the region of pattern code 2 of card 1 according to a light source switch signal output from an image data reader unit 12.

A reader device 13 is formed of a CCD (Charge Coupled Device) image sensing device to pick up the color pattern of pattern code 2 to provide the resultant image data to a data processing unit 14. Data processing unit 14 also receives a synchronizing signal in synchronization with the readout operation from image data reader unit 12. Data processing unit 14 binarizes the image data from reader device 13 in synchronization with the synchronizing signal from image data reader unit 12 to carry out a pattern determination process. The processed result is provided to a process execution unit 15. Process execution unit 15 executes a predetermined process according to the result of the pattern determination process supplied from data processing unit 14. For example, a process to output a speech of greeting is carried out.

Figure 4:
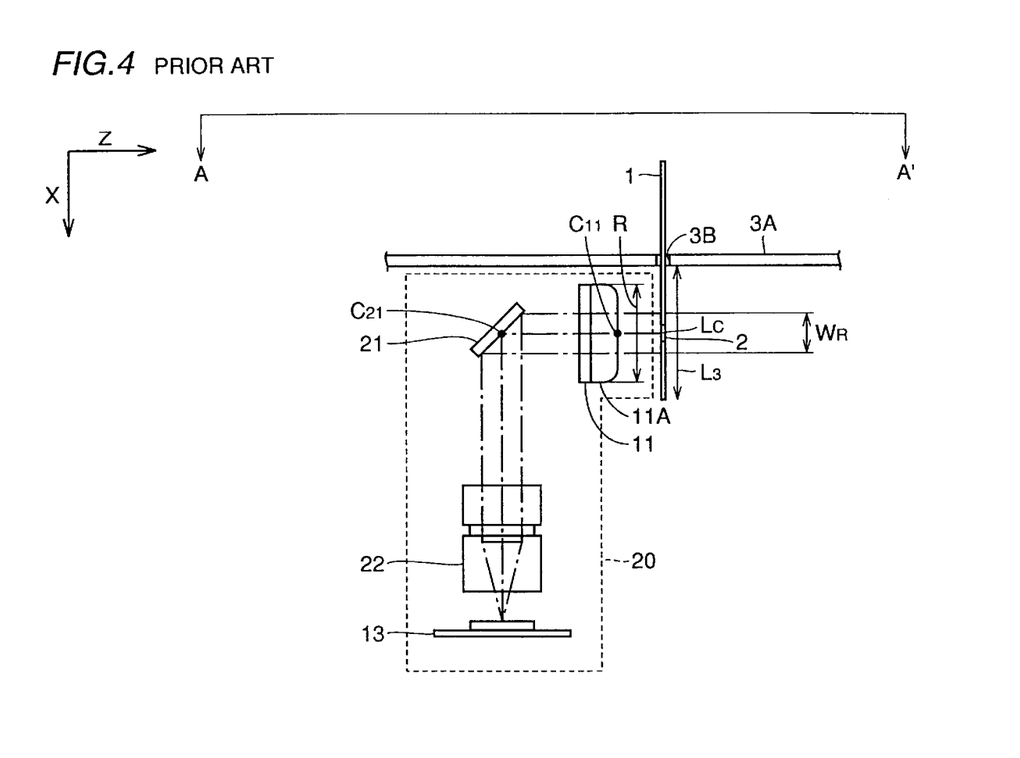
FIG. 4 shows an example of a structure of an optical system unit of the reader apparatus of FIG. 1.
Figure 5:
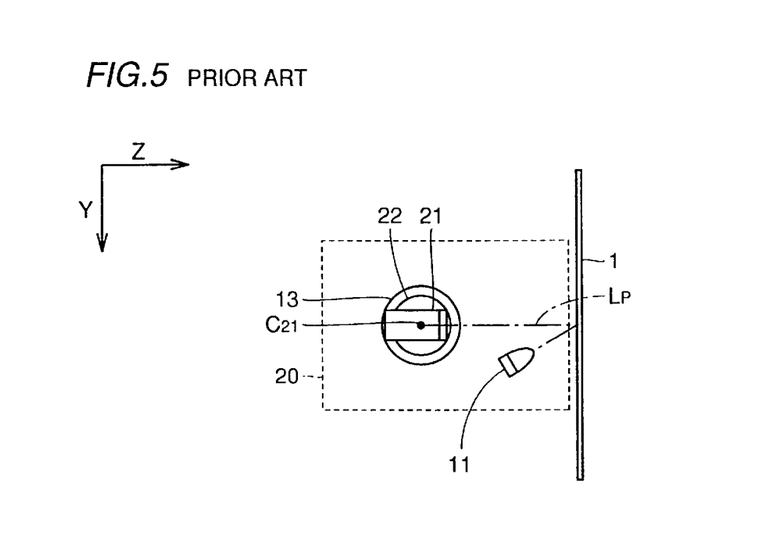
FIG. 5 shows the structure of the optical system unit of the reader apparatus of FIG. 1, viewed from another direction.

An example of the structure of an optical system unit 20 constituting the equipment of the optical system of reader apparatus 3 will be described hereinafter with reference to FIGS. 4 and 5. FIG. 4 is a cross sectional view of a structure of optical system unit 20 viewed from the direction of Y axis in FIG. 1 (cross section taken along line A–A'). In other words, the position of respective components of optical system unit 20 on the X axis and Z axis is shown in FIG. 4. FIG. 5 shows the structure of optical system unit 20 viewed from right above reader apparatus 3 of FIG. 1. In other words, the position of respective components of optical system unit 20 on the Y axis and Z axis is shown in FIG. 5.

As shown in FIG. 4, LED array 11 is installed so that the center point C11 of a light emitting plane 11A on the X axis is located on the center line LC of pattern code 2 of card 1 inserted in card slot unit 3B. Card slot unit 3B has a card slot depth L3 that ensures the foregoing position relationship between LED array 11 and card 1. The print plane of card 1 in FIG. 2 also shows the position relationship between LED array 11 and pattern code 2 (the position relationship between center point C11 and center line LC). On the Y axis, LED array 11 is installed lower than a perpendicular line LP from a predetermined position (for example, the center point) of card 1 as shown in FIG. 5.

A reflective mirror 21 is installed so that the center point C21 is located identical to center point C11 of LED array 11 on the X axis as shown in FIG. 4, and so that center point C21 is located on perpendicular line LD from card 1 on the Y axis as shown in FIG. 5. Lens 22 is installed light below reflective mirror 21 on the X axis, i.e. at a position identical to reflective mirror 21 on the Y axis as shown in FIG. 5. Reader device 13 is installed right below lens 22 on the X axis and at a position identical to reflective mirror 21 and lens 22 on the Y axis.

In optical system unit 20, LED array 11 directs a light beam of red (R), green (G) or blue (B) to pattern code 2 at each shifted point during the scanning operation on pattern code 2 of card 1 (parallel movement on the Y axis) as shown in FIG. 2. Reflective mirror 21 provides (reflects) to lens 22 the reflected light from pattern code 2 caused by the light from LED array 11. Lens 22 gathers and provides to reader device 13 the input light from reflective mirror 21. Reader device 13 converts the light from lens 22 into an electronic signal.

Figure 6:
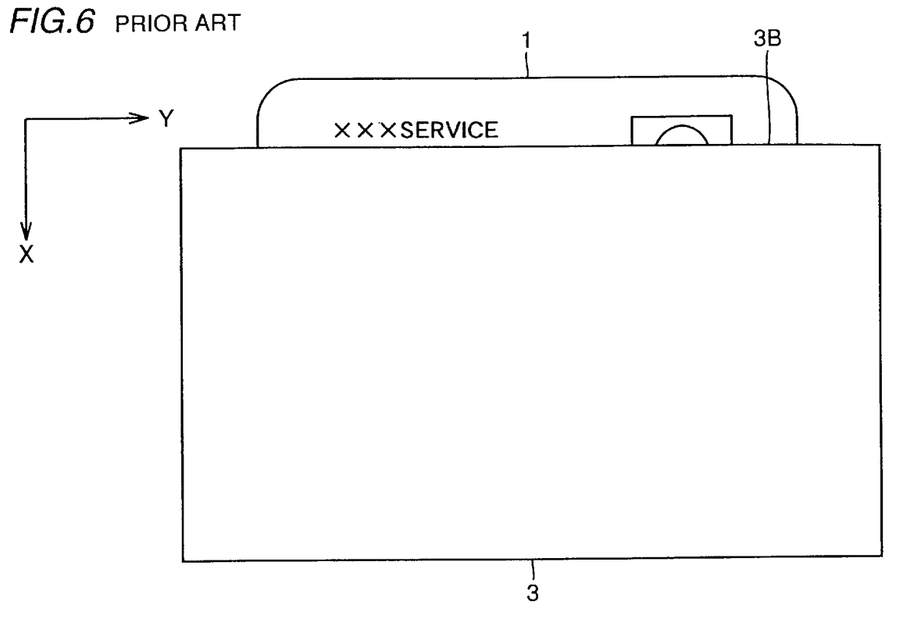
FIG. 6 shows the state of card 1 inserted in a card reader.

The quantity of light from LED array 11 is largest around the center point C11, and becomes smaller as a function of distance from center point C11. In general, the optical path length WR of the light from LED array 11 is set greater than the width WC of pattern code 2 (FIGS. 2 and 4) so that sufficient quantity of light is projected on pattern code 2 to read out information properly. Accordingly, light emitting plane 11A of LED array 11 has a diameter R greater than light path width WR, and faces card 1 as shown in FIG. 4. When center line LC of pattern code 2 of card 1 coincides with center point C11 of light emitting plane 11A on the X axis, slot depth L3 of card slot unit 3B will become larger than diameter R of light emitting plane 11A. In the state where card 1 is inserted in card slot unit 3B, the name, telephone number and picture printed on card 1 will be partially hidden by reader apparatus 3, as shown in FIG. 6. The user cannot view the entire information.

If the information printed on card 1 is hidden when inserted in card slot unit 3B (during reading of pattern code 2) to obstruct the user's visual confirmation, there was a problem that the meaning could not be conveyed sufficiently to the user of reader apparatus 3 when the information corresponding to pattern code 2 and the information provided on card 1 (for example, face picture or name) are to be used in correspondence.

SUMMARY OF THE INVENTION

In view of the foregoing, an object of the present invention is to provide a reader apparatus that prevents information located at a predetermined position on a card from being hidden even when the card is inserted in the reader apparatus.

According to an aspect of the present invention, a reader apparatus includes a reception unit receiving a card on which a pattern code is attached, a light emitting unit having a light emitting plane for emitting a light beam of a first light path width smaller than the width of the light emitting plane, a guide unit for guiding the light emitted from the light emitting unit to the pattern code on the card received through the reception unit, and a reader unit receiving light guided by the guide unit and reflected from the pattern code of the card. The guide unit includes a portion facing the card received through the reception unit. That facing portion has a length smaller than the width of the light emitting plane of the light emitting unit.

By such a reader apparatus of the above structure, the card reception depth or insertion depth in the reception unit can be set smaller than the conventional one. Since the card can be inserted into the reception unit of the reader apparatus so that the information provided at a predetermined position of the card is not hidden, the user can view the information. The card insert position can be optimized.

In the reader apparatus of the present invention, the guide unit preferably functions to convert the light of a first light path width emitted from the light emitting unit into light of a second light path width smaller than the first light path width.

In the reader apparatus of the present invention, the guide means preferably functions to guide the light reflected from the pattern code of the card to the reader unit. By such a structure, the number of components forming the reader apparatus can be reduced.

In this case, the guide unit preferably includes a reflective mirror reflecting the light emitted from the light emitting unit to guide the light towards the pattern code of the card received through the reception unit, and reflecting the light from the pattern code of the card to guide the reflected light to the reader unit. The reflective mirror preferably includes a plane facing the pattern code of the card received through the reception unit, the reader unit, and the light emitting plane of the light emitting unit.

In this case, the guide unit preferably includes a semi-transparent mirror passing the light emitted from the light emitting unit and reflecting the light from the pattern code of the card towards the reader unit. By the above structure, the distance of the light path from the pattern code of the card to the reader unit can be shortened.

In the reader apparatus of the present invention, the guide unit preferably includes a reflective mirror reflecting the light emitted from the light emitting unit to guide the light to the pattern code of the card received through the reception unit. In this case, the reflective mirror preferably includes a plane facing the card received through the reception unit and the light emitting plane of the light emitting unit.

Also in this case, the reflective mirror includes a curved plane reflecting light emitted from the light emitting unit. The curved plane preferably includes a concave facing the card received through the reception unit. By this structure, the light from the light emitting unit is converged by the reflective mirror, so that light of higher intensity can be directed to the pattern code on the card.

In the reader apparatus of the present invention, the guide unit preferably guides the light to the pattern code of the card received through the reception unit by converting the direction of the light emitted from the light emitting unit.

The reader apparatus of the present invention can further include another guide unit to guide the light reflected from the pattern code of the card to the reader unit. In this case, the another guide unit preferably includes a reflective mirror reflecting and guiding to the reader unit the light reflected from the pattern code of the card. Also, the another guide unit preferably guides the light reflected from the pattern code of the card to the reader unit by converting the direction of the light.

In the reader apparatus of the present invention, the light emitting unit preferably includes a light emitting diode, and the reader unit preferably includes a solid state image sensing device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
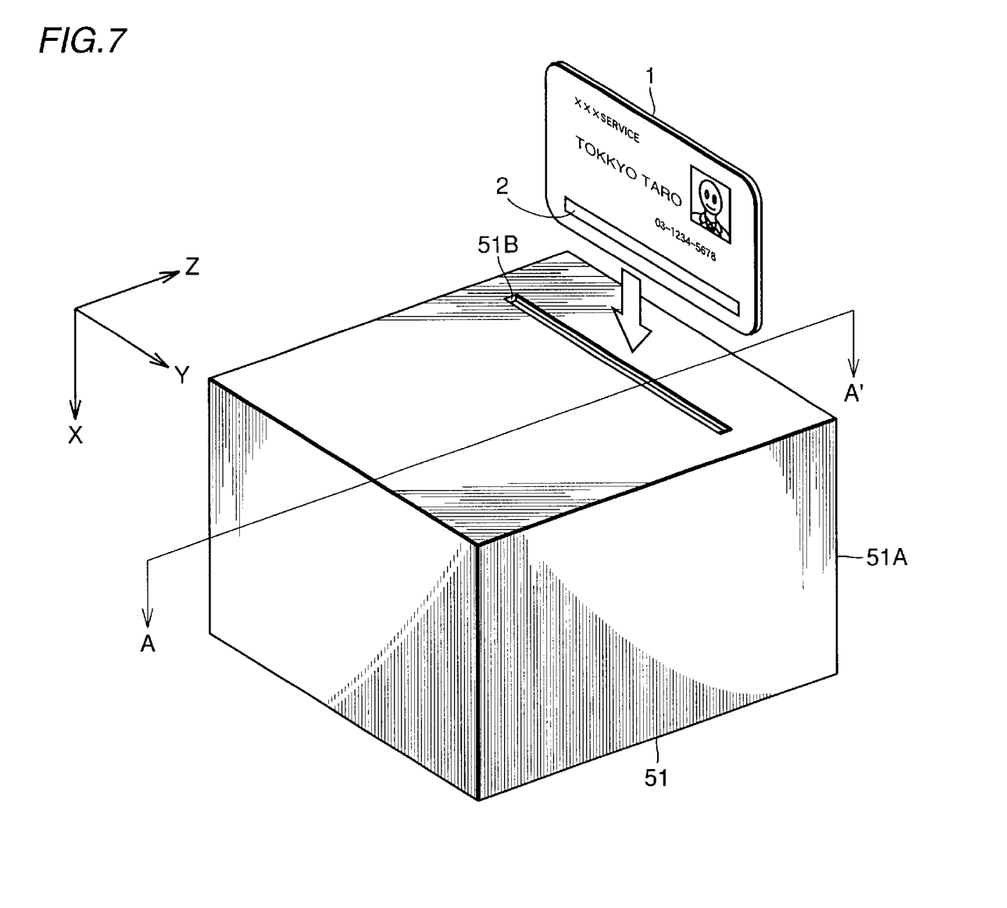
FIG. 7 shows a usage of a reader apparatus to which the present invention is applied.

FIG. 7 shows a usage of a reader apparatus 51 to which the present invention is applied. In the drawings, components corresponding to those of FIG. 1 have the same reference character allotted, and description thereof will not be repeated. When card 1 is inserted in the state shown in FIG. 7 from a card slot unit 51B provided at the top face of a package case 51A, reader apparatus 51 reads pattern code 2 of card 1.

Figure 8:
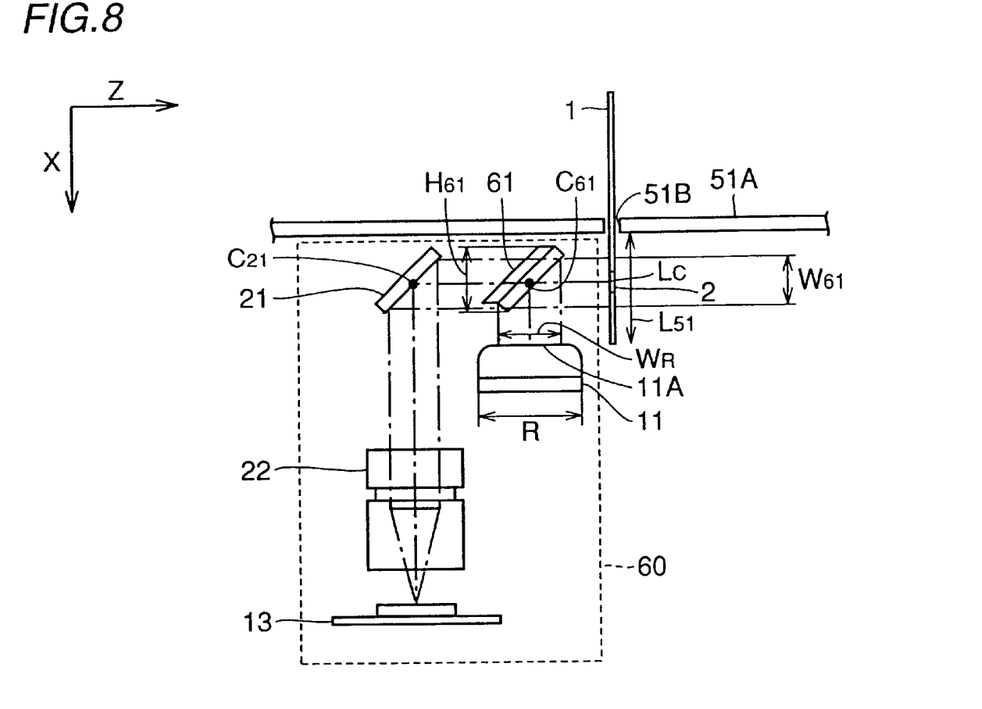
FIG. 8 shows an example of a structure of an optical system unit according to a first embodiment of the present invention in the reader apparatus of FIG. 7.
Figure 9:
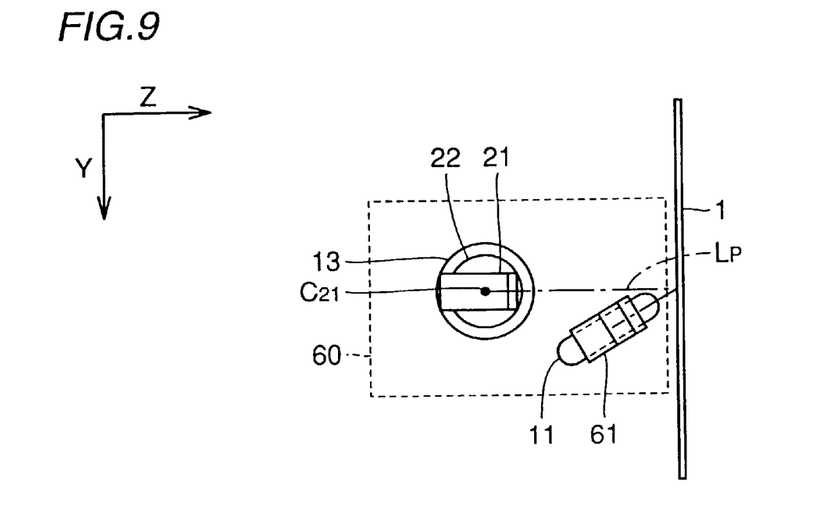
FIG. 9 shows an example of the structure of the optical system unit according to the first embodiment in the reader apparatus of FIG. 7, viewed from another direction.

FIGS. 8 and 9 are sectional views of an optical system unit 60 according to a first embodiment of the present invention in reader apparatus 51, viewed from the direction of Y axis and X axis, respectively. Components corresponding to those of FIGS. 4 and 5 have the same reference character allotted, and description thereof will not be repeated.

As shown in FIG. 8, LED reflective mirror 61 is installed so that the center point C61 on the X axis is located identical to the center line LC of pattern code 2 of card 1 inserted in card slot unit 51B. In other words, card slot unit 51B has a card slot depth L51 that ensures the foregoing position relationship between LED reflective mirror 61 and card 1.

LED array 11 is installed below LED reflective mirror 61 on the X axis in the view of FIG. 8. Light emitting plane 11A thereof is provided to face LED reflective mirror 61. LED array 11 is installed at a position on the Y axis as shown in FIG. 9, similar to the position of FIG. 5. The position of LED mirror 61 on the Y axis is substantially identical to the position of LED array 11.

The light of red (R), green (G) or blue (B) emitted from LED array 11 is reflected by LED reflective mirror 61 to be directed to card 1 (pattern code 2) inserted in card slot unit 51B. The reflected light of the beam directed to pattern code 2 is provided to reader device 13 via reflective mirror 21 and lens 22.

Figure 10:
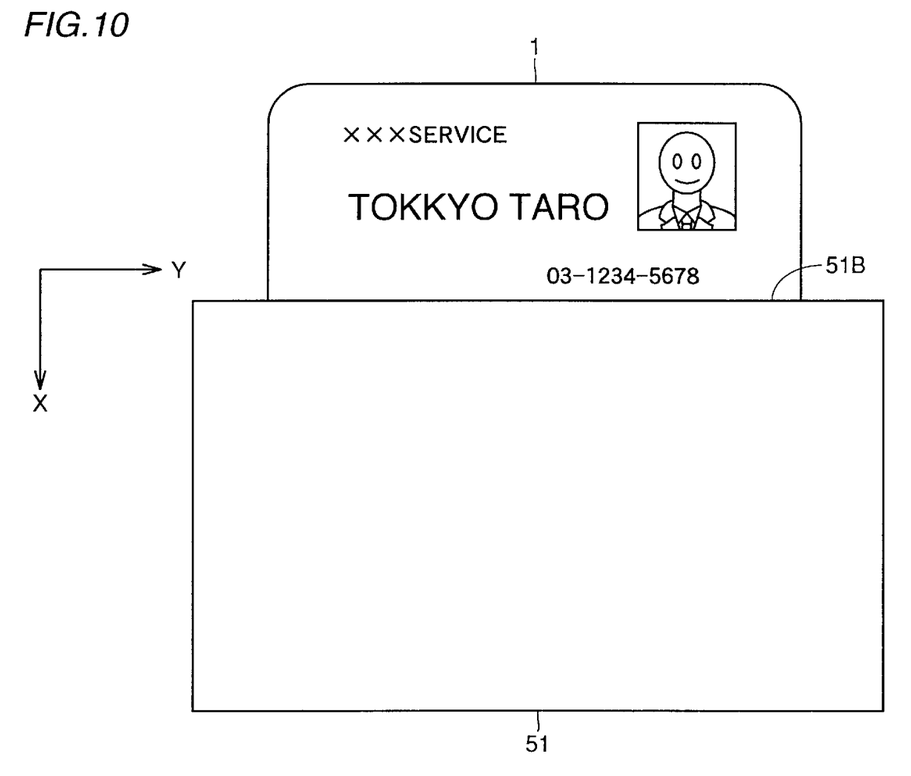
FIG. 10 shows the state of the card inserted in the reader apparatus.

LED reflective mirror 61 functions to convert the light having a light path width WR from LED array 11 into light having a light path width W61 smaller than light path width WR, and direct the converted light to pattern code 2. The length H61 of the portion of LED reflective mirror 61 on the X axis corresponding to card 1 becomes smaller than diameter R of light emitting plane 11A of LED array 11. As a result, slot depth L51 of card slot unit 51B is smaller than slot depth L3 of card slot unit 3B in reader apparatus 3 shown in FIG. 4, for example. Therefore, the name, telephone number, picture, and the like printed on the print plane of card 1 will not be hidden, as shown in FIG. 10, even when card 1 is inserted in card slot unit 51B.

Figure 11:
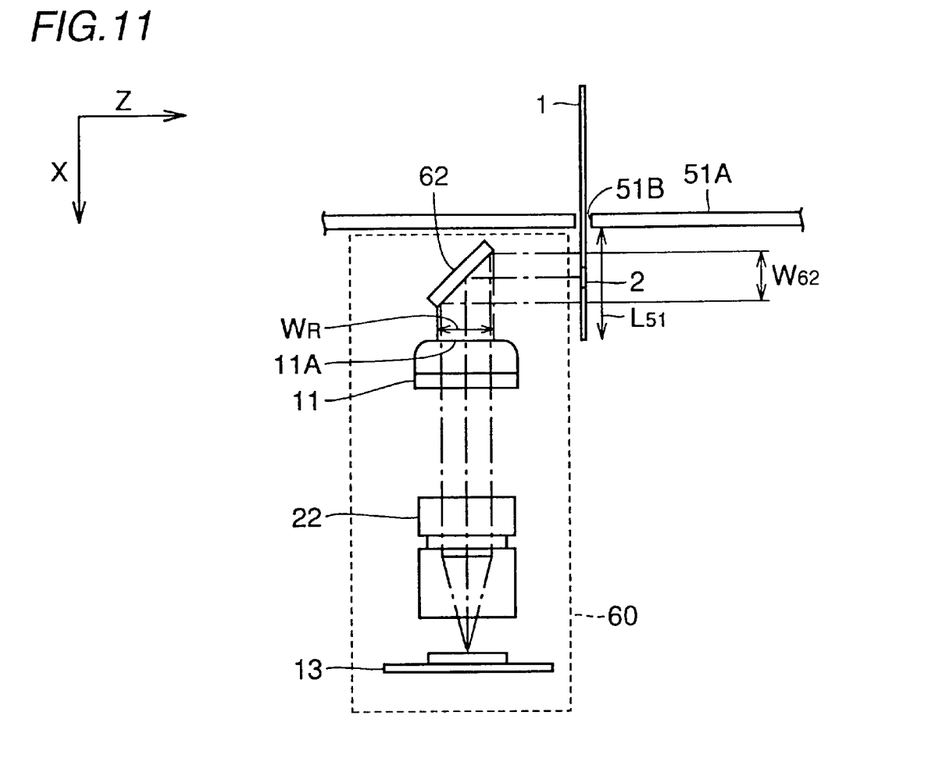
FIG. 11 shows an example of a structure of the optical system unit according to a second embodiment of the present invention in the reader apparatus of FIG. 7.
Figure 12:
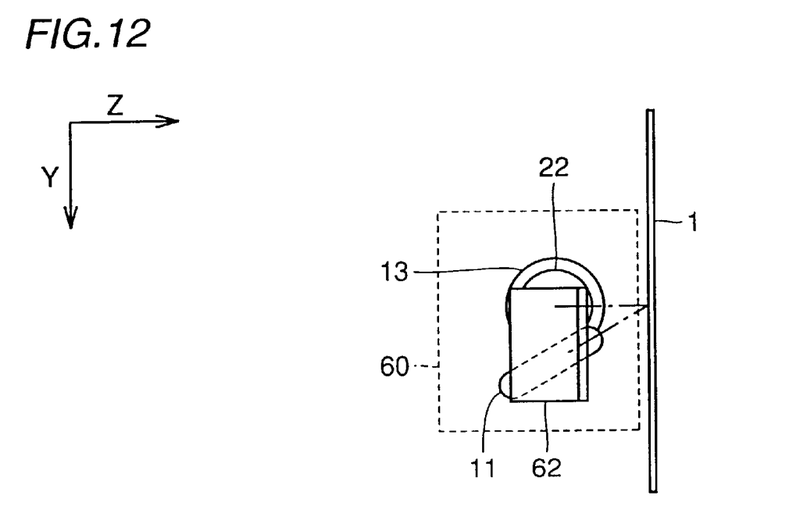
FIG. 12 shows an example of the structure of the optical system unit of the second embodiment in the reader apparatus of FIG. 7, viewed from another direction.

FIGS. 11 and 12 are cross sectional views of optical system unit 60 according to a second embodiment of the present invention, viewed from the direction of X axis and Y axis, respectively. Components corresponding to those of FIGS. 8 and 9 have the same reference characters allotted, and description thereof will not be repeated. A reflective mirror 62 reflects the light from LED array 11 to be directed to card 1 (pattern code 2), and provides (reflects) to lens 22 the reflected light from pattern code 2. By this structure, the components forming optical system unit 60 can be reduced (only one reflective mirror 62 is required for the reflective mirror). Light path width W62 of the light from reflective mirror 62 is smaller than the light path width WR of LED array 11. Card slot depth 51B has a slot depth of L51.

Figure 13:
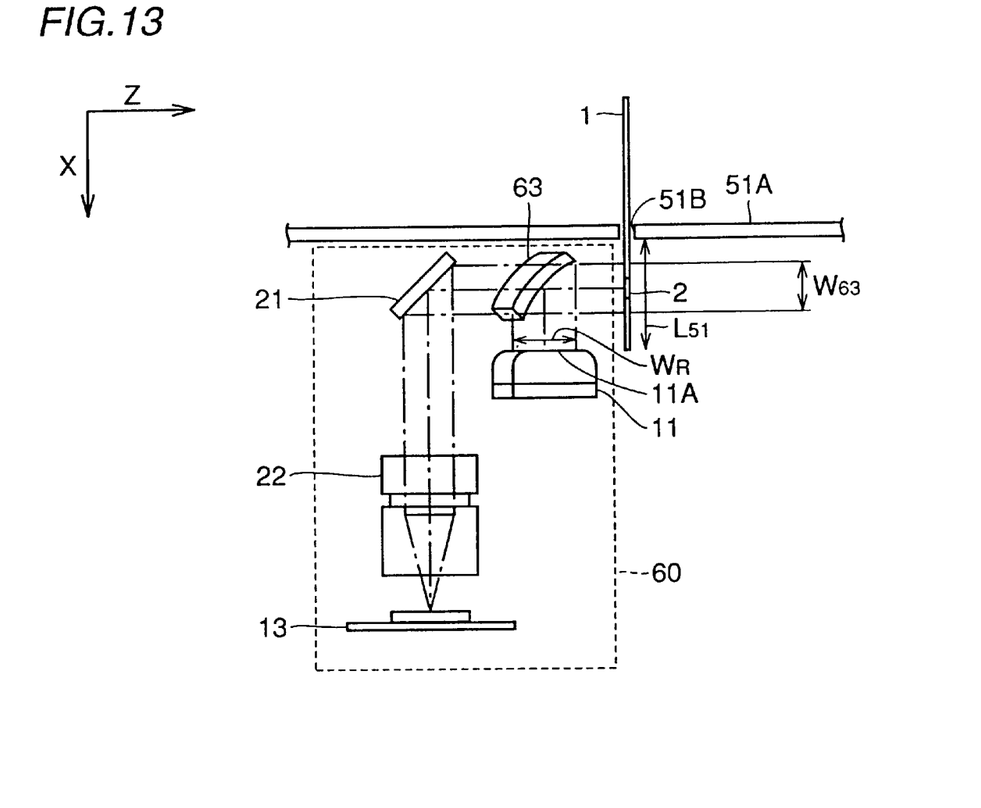
FIG. 13 shows an example of a structure of an optical system unit according to a third embodiment of the present invention in the reader apparatus of FIG. 7.
Figure 14:
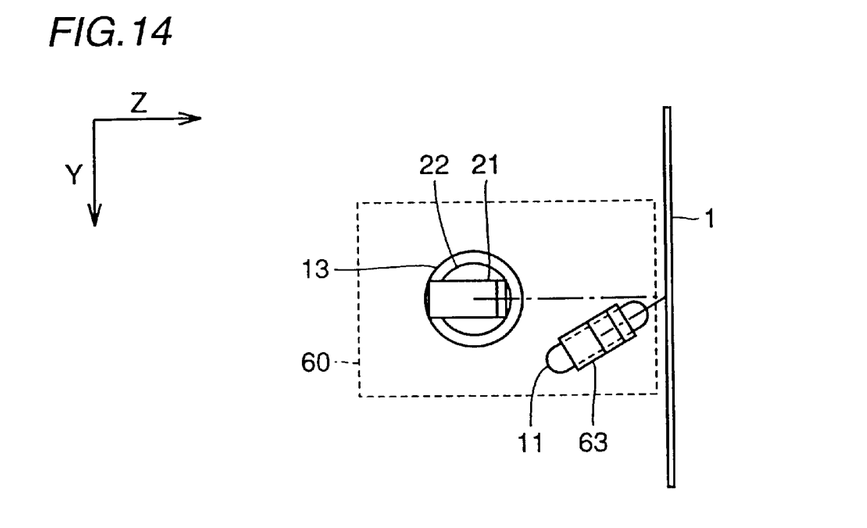
FIG. 14 shows an example of the structure of the optical system unit of the third embodiment in the reader apparatus of FIG. 7, viewed from another direction.
Figure 15:
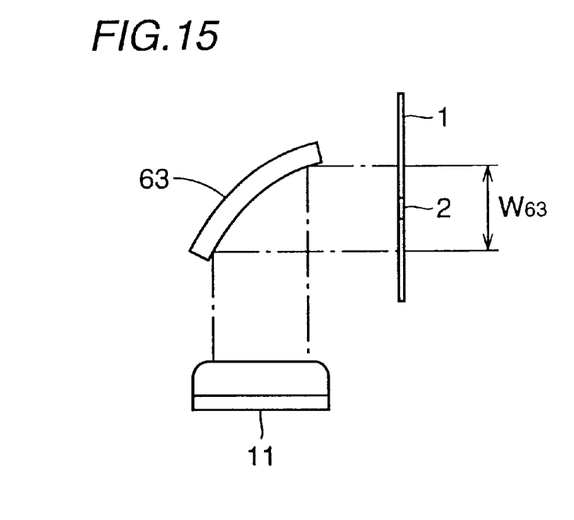
FIG. 15 shows the shape of the reflective mirror of FIG. 13.

FIGS. 13 and 14 are sectional views of optical system unit 60 according to a third embodiment of the present invention, viewed from the direction of Y axis and the X axis, respectively. This optical system unit is provided with a reflective mirror 63 instead of LED reflective mirror 61 of optical system unit 60 of FIGS. 8 and 9. Reflective mirror 63 has a curved reflection plane. The concave of reflective mirror 63 faces card 1, as shown in FIG. 15. Accordingly, the light from LED array 11 is converged, so that light of higher intensity is directed to pattern code 2 of card 1. Light path width W63 of the light from reflective mirror 63 is set smaller than light path width WR of LED array 11. Card slot unit 51B has a slot depth of L51.

Figure 16:
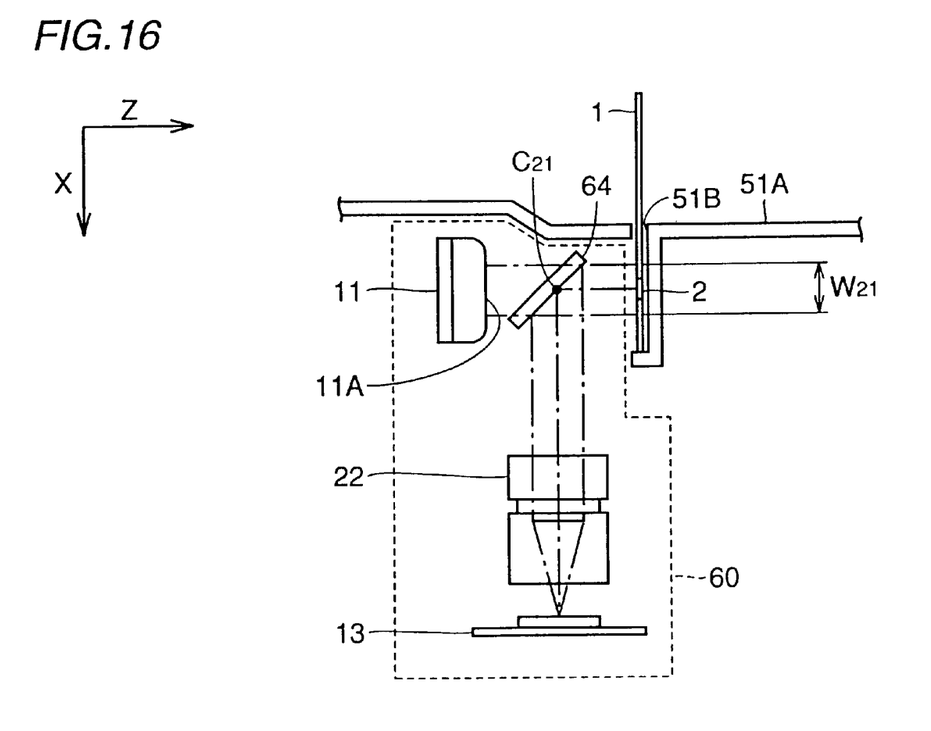
FIG. 16 shows an example of a structure of an optical system unit according to a fourth embodiment of the present invention in the reader apparatus of FIG. 7.
Figure 17:
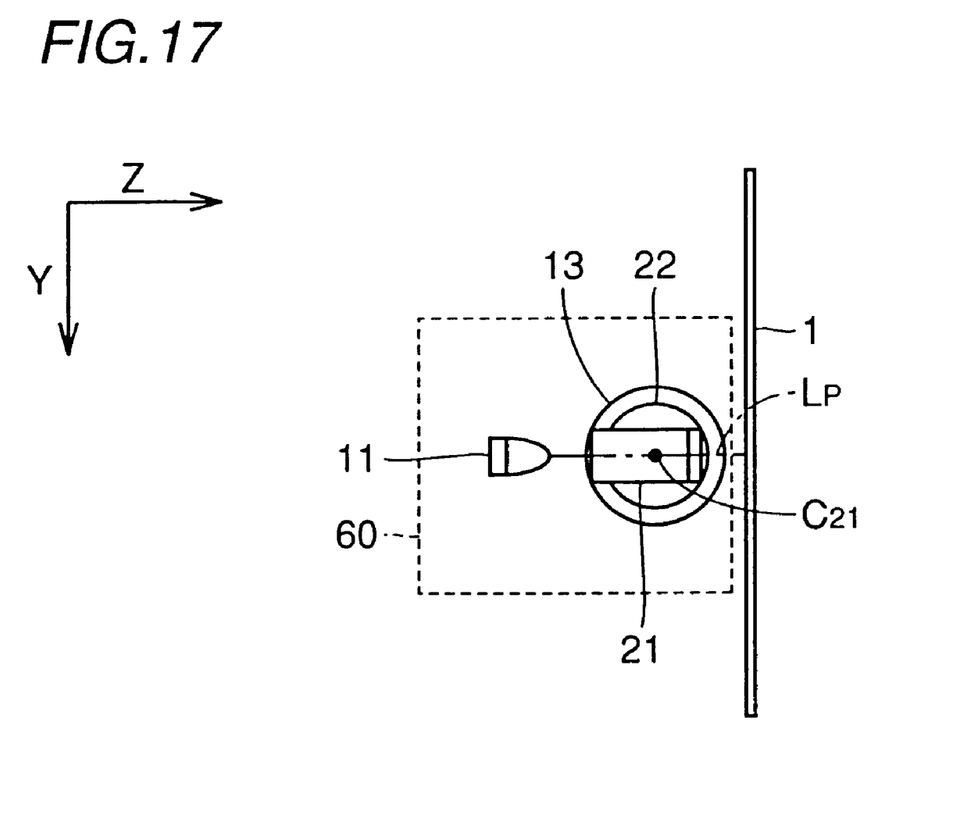
FIG. 17 shows an example of the structure of the optical system unit of the fourth embodiment in the reader apparatus of FIG. 7.

FIGS. 16 and 17 are sectional views of optical system unit 60 according to a fourth embodiment, viewed from the direction of Y axis and X axis, respectively. Components corresponding to those of FIGS. 4 and 5 have the same reference characters allotted. In the fourth embodiment, LED array 11 is located at the left side of reflective mirror 64 in the view of FIG. 16 on the Z axis. Reflective mirror 64 is a semi-transparent mirror installed so that the center point C21 is located on a perpendicular line from card 1. Reflective mirror 64 passes the light from LED array 11 to direct the light onto pattern code 2 of card 1. Reflective mirror 64 also provides (reflects) the reflected light from pattern code 2 to lens 22. By the above structure, the distance of the light path from pattern code 2 of card 1 to reader device 12 becomes shorter in optical system unit 60.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reader apparatus comprising:
   reception means for receiving a card having a pattern code,
   light emitting means having a light emitting plane for emitting light of a first light path width smaller than a width of said light emitting plane,
   guide means having a portion facing said card received through said reception means for guiding light emitted from said light emitting means to the pattern code of said card received through said reception means, said facing portion having a length smaller than the width of the light emitting plane of said light emitting means, and
   reader means for receiving light reflected from the pattern code of said card out of the light guided by said guide means.

2. The reader apparatus according to claim 1, wherein said guide means functions to guide light reflected from the pattern code of said card to said reader means.

3. The reader apparatus according to claim 2, wherein said guide means comprises a reflective mirror reflecting light emitted from said light emitting means to guide the light to the pattern code of said card received through said reception means, and reflecting light reflected from the pattern code of said card to said reader means.

4. The reader apparatus according to claim 3, wherein said reflective mirror includes a plane facing the pattern code of said card received through said reception means, said reader means and said light emitting plane of said light emitting means.

5. The reader apparatus according to claim 2, wherein said guide means comprises a semi-transparent mirror passing light emitted from said light emitting means, and reflecting light reflected from the pattern code of said card towards said reader means.

6. The reader apparatus according to claim 1, wherein said guide means comprises a reflective mirror reflecting light emitted from said light emitting means to guide the light towards the pattern code of said card received through said reception means.

7. The reader apparatus according to claim 6, wherein said reflective mirror includes a plane facing the card received through said reception means and the light emitting plane of said light emitting means.

8. The reader apparatus according to claim 6, wherein said reflective mirror includes a curved plane reflecting light emitted from said light emitting means, said curved plane having a concave facing said card received through said reception means.

9. The reader apparatus according to claim 1, wherein said guide means guides light emitted from said light emitting means to the pattern code of said card received through said reception means by converting direction of the light.

10. The reader apparatus according to claim 1, comprising:

further guide means for guiding light reflected from the pattern code of said card to said reader means.

11. The reader apparatus according to claim 10, wherein said another guide means comprises a reflective mirror reflecting light reflected from the pattern code of said card to guide the reflected light to said reader means.

12. The reader apparatus according to claim 10, wherein said another guide means guides light reflected from the pattern code of said card to said reader means by converting direction of the light.

13. The reader apparatus according to claim 1, wherein said light emitting means comprises a light emitting diode.

14. The reader apparatus according to claim 1, wherein said reader means comprises a solid state image sensing device.

15. A reader apparatus comprising:

reception means for receiving a card on which a pattern code is attached, light emitting means having a light emitting plane for emitting light of a first light path width smaller than a width of said light emitting plane, guide means having a portion facing said card received through said reception means, wherein said guide means functions to convert light of a first light path width emitted from said light emitting means into light of a second light path width smaller than said first light path width for guiding light emitted from said light emitting means to the pattern code of said card received through said reception means, said facing portion having a length smaller than the width of the light emitting plane of said light emitting means, and reader means for receiving light reflected from the pattern code of said card out of the light guided by said guide means.

16. A reader for reading an optical code comprising:

a light source having a light-emitting surface, said light-emitting surface having an emitting-surface width, said light-emitting surface being adapted to emit light having a first light path width, said first light path width being smaller than said emitting-surface width;

an optical device disposed within said first light path, said optical device adapted to redirect at least a portion of said light along a second light path;

a mechanical receiver for receiving a substrate bearing an optical code, said receiver being adapted to position said substrate such that said optical code is disposed within said second light path and optically couples with and modulates at least a portion of said light to produce a modulated light; and an optical receiver for receiving at least a portion of said modulated light, and for producing a signal responsive to a modulation pattern of said modulated light.

17. A method of reading an optical code comprising:

emitting a beam of light in a first orientation from a surface of a light source, said surface having a first width, said beam of light having a second width, said first width being wider than said second width;

changing a direction of said beam of light from said first orientation to a second orientation;

impinging said beam of light on an optical pattern thereby modulating said beam of light to form a modulated beam;

detecting said modulated beam; and producing an output signal corresponding to said modulated beam.

* * * * *